(12) United States Patent
Yu et al.

(10) Patent No.: US 8,010,139 B2
(45) Date of Patent: Aug. 30, 2011

(54) METHOD IMPROVING THE CROSS-LAYER MULTIMEDIA TRANSMISSION QUALITY IN COGNITIVE RADIO NETWORKS

(75) Inventors: Fei Yu, Shanghai (CN); Xia Zhang, Shanghai (CN); Xin Zhang, Shanghai (CN); Tao Ning, Shanghai (CN); Jinfeng Yang, Shanghai (CN)

(73) Assignee: Shanghai Mobilepeak Semiconductor, Co., Ltd., Shanghai (CN)

( * ) Notice: Subject to any disclaimer, the term of this patent is extended or adjusted under 35 U.S.C. 154(b) by 532 days.

(21) Appl. No.: 12/238,637

(22) Filed: Sep. 26, 2008

(65) Prior Publication Data
US 2009/0158358 A1  Jun. 18, 2009

(30) Foreign Application Priority Data

Dec. 12, 2007  (CN) .......................... 2007 1 0172129

(51) Int. Cl.
*H04Q 7/20* (2006.01)
(52) U.S. Cl. ............... 455/509; 455/450; 455/422.1; 455/403; 455/466; 455/446; 370/328; 370/329; 370/310; 370/236.2; 370/343
(58) Field of Classification Search .............. 455/509, 455/507, 500, 517, 450–452.2, 403, 422.1, 455/406–409, 550, 551, 552.1, 67.11, 405, 455/466, 446; 370/343, 328, 329, 310, 236.2
See application file for complete search history.

(56) References Cited

U.S. PATENT DOCUMENTS

| | | | |
|---|---|---|---|
| 2008/0304404 A1* | 12/2008 | Lu et al. | 370/210 |
| 2009/0149208 A1* | 6/2009 | Huttunen et al. | 455/509 |
| 2010/0238868 A1* | 9/2010 | Melpignano et al. | 370/329 |

* cited by examiner

*Primary Examiner* — Keith Ferguson
(74) *Attorney, Agent, or Firm* — Banner & Witcoff, Ltd.

(57) ABSTRACT

The present invention relates to a paper-breaker touching safety protector, of which the control circuit unit is connected with the paper-breaking machinery part via the motor driving circuit unit, the control circuit unit is connected with the conductive touch panel via the touch detecting circuit unit, the power unit is connected respectively with the control circuit unit and motor driving circuit unit, wherein the touch detecting circuit unit includes the bio-voltage control switch circuit and ground switch circuit, the input control terminal of bio-voltage control switch circuit is connected with the conductive touch panel, the output terminal of control switch circuit is connected with the input control terminal of the ground switch circuit, the output terminal of the ground switch circuit is connected with the input control terminal of the control circuit unit. The paper-breaker touching safety protector with this structure could effect a protective rule from the accident harm and a real-time monitor; the controlling is safe and sensitive with a simple circuit structure and reliable operation performance, it functions a convenient manipulation and wide usability with the safety.

8 Claims, 1 Drawing Sheet

Slot

Slot

METHOD IMPROVING THE CROSS-LAYER MULTIMEDIA TRANSMISSION QUALITY IN COGNITIVE RADIO NETWORKS

CROSS-REFERENCE TO RELATED APPLICATIONS

The present application claims the benefit of priority to Chinese Application No. 200710172129.0, filed Dec. 12, 2007 in China, the content is incorporated by reference herein.

TECHNOLOGY FIELD

The present invention relates to the wireless communications, especially relates to the cognitive radio networks technology, in the concrete, relates to a method improving the cross-layer multimedia transmission quality in cognitive radio networks.

BACKGROUND TECHNOLOGY

Recently there has been widespread acceptance of wireless applications, which has triggered a huge demand for radio spectrum. After many years of spectrum assignment, there exists a heavily crowded spectrum where most spectrum bands have already been assigned to licensed (primary) users, the current spectrum assignment, however, presents a low spectrum usage, improving the spectrum utilization is hence raising an urgent question.

Among the recent technologies, Joseph Mitola, the adviser of MITRE Co & Doctor of Sweden Imperial Technology University, and professor GERALD Q MAGUIRE, JR, put forward the cognitive radio technology in the IEEE Personal Communications in August 1999. This so called Cognitive Radio technology reasons the radio spectrum action controlling rule (such as radio frequency band, air interface, protocol and space & time model etc) by the model-based method in the radio field, with the realizing language through radio knowledge (RKRL), express the knowledge of radio rule, equipment, software module, wave propagation property, network, user demand and application scene, and thus increase the personal business flexibility to meet users requirements better with the software radio technology. Its core ideal is to sense intellectually which part of spectrum bands is being used or not, and the cognitive radio system may use the same spectrum band to communicate temporary in case of sensing out that a certain spectrum bands aren't be used. In time of a secondary user using the licensed spectrum source in "borrow" way, his communication mustn't affect the other primary user's communication. Secondary user, therefore, should employ the non-used spectrum band in accordance with certain rule. Among the cognitive radio technology, this kind of rule is loaded to the communication terminal with a certain form understood by machine (such as XML language). Owing to the fact that the rule could be adjusted according to the spectrum usage, communication load and distribution etc, the spectrum administrator could control the valuable spectrum source more flexible by these rules.

The cognitive radio technology put forwarded as a newly conception has an even widen coverage. The basic definition of cognitive radio is given by that the cognitive radio is a kind of intellectually communication system sensible to outside communication environment. The cognitive radio system senses the outside environment changement continuously by study, and adapts to the environment changement through adaptive adjusting the communication mechanism within itself. This adaptive adjusting is to improve the system stabilization on one side, and increase the spectrum source output coefficient on the other side.

Although much work has been done in cognitive networks dynamic distribution, most previous work considers maximizing the throughput of secondary users as one of the most important design criteria. As a consequence, other qualities of service (QoS) measures for secondary users, such as distortion for multimedia transmission, are mostly ignored in the literature. However, such as video, recent work in cross-layer design shows that maximizing throughput does not necessarily benefit the quality of service at application layer for some multimedia applications. From a users' point of view, the quality of service for cognitive radio is surely poor than that of other general radio access and is more important than that at other layers.

Most of the wireless local area network (WLAN) technology and wireless personal area network (WPAN) technology use the unlicensed spectrum bands, among which, the multimedia applications such as video conferencing got a rapid development. Lossy video compression standard such as MPEG4 and H264 exploit the spatial redundancy to reduce the required bandwidth to transmit video. Compressed video comprises of intra- and inter-coded frames. The intra refresh rate is an important application layer parameter. Adaptively adjusting the intra-refresh rate for online video encoding applications, can combat the time varying wireless channels available to secondary users to improve the service quality to secondary users for transmission over cognitive radio networks.

DISCLOSURE OF THE INVENTION

It is therefore an object of the present invention to provide a method improving the cross-layer multimedia transmission quality in cognitive radio networks that allows the disadvantages described above to be solved, and which improves effectively the service quality to secondary users for multimedia transmission over cognitive radio networks in application layer, lower the video transmission distortion rate, cut down system source, simplify process, stabilize operation property with a large suitable range.

Therefore, the method improving the cross-layer multimedia transmission quality in cognitive radio networks according to present invention is as follows:

A method improving the cross-layer multimedia transmission quality in cognitive radio networks, characterized in that: Said method comprises the following steps:

(1) Determining the state space of cognitive radio networks system and the observation probability of spectrum observing sensor;

(2) Determining the behavior space and the information state of the cognitive radio networks system;

(3) Determining the transmission immediate cost of the cognitive radio networks system;

(4) Calculating and obtaining the sensing policy of spectrum observing sensor in the cognitive radio networks system based on said immediate cost;

(5) Obtaining the optimal intra-refresh rate under the minimum distortion rate condition in said cognitive radio networks system based on said sensing policy;

(6) Operating the following-up encoding for the multimedia data information to be transmitted in the cognitive radio networks system based on the optimal intra-refresh rate.

In the method improving the cross-layer multimedia transmission quality in cognitive radio networks, said determining the state space of the cognitive radio networks system is concretely as follows:

Set up the disperse & even Markov process model $V_k$ for the cognitive radio networks system based on the following formula:

$$V_k = [X_k(1), \ldots, X_k(N)], V_k \in \mathbb{S} = \{e_1, e_2, \ldots, e_{S-1}, e_S\}^N$$

Where, $\{X_k(n)\}$ refers to the Markov chain of a channel n in S state, wherein the $X_k \in \{e_1, e_2, \ldots, e_{S-1}, e_S\}$, k refers to the slot in the cognitive radio networks, N refers to the channel amount in the radio network system.

In the method improving the cross-layer multimedia transmission quality in cognitive radio networks, said determining the observation probability of spectrum observing sensor in cognitive radio networks system is concretely as follows:

Determining the observation probability Pr of the channel acknowledge information observed by the spectrum observing sensor based on the following formula:

$$Pr\{Y_k | V_k, \Psi_k\} = B_k(Y_k, V_k, \Psi_k);$$

Where, $V_k$ refers to the system state in the cognitive radio networks system, $\Psi_k$ refers to the acting behavior, $Y_k$ refers to the channel acknowledge information, $Y_k \in \mathbb{A}_\gamma$, $\mathbb{A}_\gamma = \{\hat{\gamma}_1, \ldots, \hat{\gamma}_{S-1}, \hat{\gamma}_S\}$, for any $i<j$, $\hat{\gamma}_i < \hat{\gamma}_j$ to be satisfied;

In the method improving the cross-layer multimedia transmission quality in cognitive radio networks, said determining the behavior space of the cognitive radio networks system is concretely as follows:

Determining the complex behavior $\Psi_k$ of the cognitive radio networks system based on the following formula:

$$\Psi_k = \{a_k(\epsilon_k, \delta_k), \Phi_k, \hat{\beta}_k\} \in (\mathbb{A}_{\gamma, s}, \mathbb{A}_{\gamma, \delta}, \{0, 1\}, \mathbb{A}_{\gamma, \beta});$$

Where, $a_k$ refers to the channel selection, $a_k \in \mathbb{A}_{\gamma, \delta}$; wherein the $(\epsilon_k(\alpha_k), \delta_k(\alpha_k)) \in \mathbb{A}_{\gamma, \delta}$ refers to the decision of the spectrum observing sensor, $\mathbb{A}_{\gamma, \delta}$ refers to the effective point on the receiver operation curve ROC, $\epsilon$ refers to the error alarm probability, whereas the $\Phi_k(a_k)$ refers to the access decision and the $\Phi_k(a_k) \in (0, 1)$, where the 0 indicates no access, 1 indicates access, $\beta_k(a_k)$ refers to the intra-refresh rate and $\beta_k(a_k) \in \mathbb{A}_{\gamma, \beta}$, $\hat{\beta}_k$ refers to the estimate value of $\beta_k$.

In the method improving the cross-layer multimedia transmission quality in cognitive radio networks, said determining the information state of the cognitive radio networks system is concretely as follows:

Determining the information state $\pi_k$ of the cognitive radio networks system based on the following formula:

$$\pi_k = \{\lambda_s(k)\}_{s \in S} \in \Pi^{\mathbb{S}}$$

Where, the $\lambda_S(k) \in [0,1]$ refers to the probability prior to the state changeover when the system is under the state of $s \in \mathbb{s}$ starting from slot k, $\Pi(\mathbb{s}) = \{\lambda_S(k) \in ([0,1], \Sigma_{s \in \mathbb{s}} \lambda_S = 1\}$ refers to the information space containing the most function conditions probability in the state space s the information state $\pi_k$ is refreshed as the following before the state transition according to the Bayes theorem:

$$\pi_{k+1} = \frac{\sum_{s' \in \mathbb{S}} \lambda_{s'}(k) A_{s',s} B(Y_k, s, \Psi_k)}{\sum_{s \in \mathbb{S}} \sum_{s' \in \mathbb{S}} \lambda_{s'}(k) A_{s',s} B(Y_k, s, \Psi_k)};$$

Where, $Y_k$ refers to the channel confirming information received by the transmitter in the end of slot k.

In the method improving the cross-layer multimedia transmission quality in cognitive radio networks, said determining the transmission immediate cost of the cognitive radio networks system is concretely as follows:

Determining the total distortion mathematics expectation of the multimedia data information in the radio network system based on the following formula:

$$J_\mu = \mathbb{E}_{\{\mu_\delta, \mu_S, \mu_\Phi, \mu_\beta\}} \left[ \sum_{k=1}^{T} D(V_k, R_n, \Phi_k(n), \hat{\beta}_k(n)) \right];$$

Where, $C = D(V_k, R_n, \Phi_k(n), \hat{\beta}_k(n))$ refers to the multimedia data information distortion in the cognitive radio networks system, whereas $\mathbb{E}_{\{\mu_\delta, \mu_S, \mu_\Phi, \mu_\beta\}}$ refers to the mathematics expectation under the condition of dual $\mu_\delta$, $\mu_S$, $\mu_\Phi$, $\mu_\beta$, $\mu_\delta$ refers to the constraint condition in case of setting up the loss sensing probability $\delta$ in the spectrum observing sensor operation point, $\mu_S$ refers to the constraint condition of state S, $\mu_\Phi$ refers to the constraint condition of access discrimination, $\mu_\beta$ refers to the constraint condition of intra-refresh rate, T refers to the slot and $R_n$ refers to the target bit rate of channel n.

In the method improving the cross-layer multimedia transmission quality in cognitive radio networks, said Calculating and obtaining the sensing policy of spectrum observing sensor in the cognitive radio networks system based on said immediate cost is concretely as follows:

The sensing policy of spectrum observing sensor in the cognitive radio networks system is then given by the following formula:

$$J_k(\pi) = \min_{a \in \mathbb{A}_S} \sum_{s \in \mathbb{S}} \sum_{s' \in \mathbb{S}} \lambda_{s'}(t) A_{s',s} \times$$

$$\sum_{j=1}^{S} B(y_k, j, \Psi_k) [D(V_k, R_n, \Phi_k(n), \hat{\beta}_k(n)) + J_{k+1}(T(\pi_k | \Psi_k, y_k))],$$

$$1 \leq k \leq T - 1;$$

$$J_T(\pi) =$$

$$\min_{a \in \mathbb{A}_S} \sum_{s \in \mathbb{S}} \sum_{s' \in \mathbb{S}} \lambda_{s'}(t) A_{s',s} \times \left[ \sum_{j=1}^{S} B(y_k, j, \Psi_k) D(V_k, R_n, \Phi_k(n), \hat{\beta}_k(n)) \right];$$

Where, B (y, s, $\Psi$) is then given by:

$$B(y < \hat{\gamma}_s, s < S, \Psi) = P_{ce}(s, v(y)) \epsilon^*;$$

$$B(y = \hat{\gamma}_s, s < S, \Psi) = 1 - \epsilon^*;$$

$$B(y < \hat{\gamma}_s, s = S, \Psi) = \frac{1 - \epsilon^*}{S - 1};$$

$$B(y = \hat{\gamma}_s, s = S, \Psi) = \epsilon^*;$$

$v(y) = i$, $1 < i < S$, $y = \hat{\gamma}_i$, $\epsilon^*$ is the value of error alarm probability $\epsilon$ when $\delta = \zeta$ on the receiver operating curve ROC, $$P_{ce}(i, j) = \frac{1}{2} \text{erf}\left( \frac{\gamma_j + \gamma_{j+1} - 2\gamma_i}{2\sqrt{2}\sigma} \right) - \frac{1}{2} \text{erf}\left( \frac{\gamma_j + \gamma_{j-1} - 2\gamma_i}{2\sqrt{2}\sigma} \right);$$

-continued $$P_{ce}(i, 1) = \frac{1}{2}\left[1 + \text{erf}\left(\frac{\gamma_1 + \gamma_2 - 2\gamma_i}{2\sqrt{2}\,\sigma}\right)\right];$$

$$P_{ce}(i, S-1) = \frac{1}{2}\left[1 - \text{erf}\left(\frac{\gamma_{S-2} + \gamma_{S-1} - 2\gamma_i}{2\sqrt{2}\,\sigma}\right)\right];$$

$$P_{ce}(i, s) = 0;$$

σ refers to the standard deviation of error estimated by channel receiver, and the erf refers to error function.

In the method improving the cross-layer multimedia transmission quality in cognitive radio networks, said obtaining the optimal intra-refresh rate under the minimum distortion rate condition in cognitive radio networks system based on said sensing policy consists of following steps;

(51) Obtaining the minimum total distortion mathematics expectation $J_\mu$ of the multimedia data information in the radio network system based on said sensing policy;

(52) Obtaining a group of intra-refresh rate $\hat{\beta}_k$ based on the following formula:

$$J_\mu = \mathbb{E}_{\{\mu_\delta, \mu_S, \mu_\Phi, \mu_\beta\}}\left[\sum_{k=1}^{T} D(V_k, R_n, \Phi_k(n), \hat{\beta}_k(n))\right];$$

(53) Obtaining the optimal intra-refresh rate β* under the minimum distortion rate condition based on following formula:

$$\beta^* = \arg\min_{\beta}\{\overline{D_s(R_s, \beta)} + \overline{D_c(p, \beta)}\};$$

Where, arg refers to the calculation symbol of β that minimums the value in the { } expression, $D_s$ refers to the source distortion, $\overline{D_s(R_s,\beta)} = \overline{D_s(R_s,0,n)} + \beta(1-\lambda+\lambda\beta)[\overline{D_s(R_s,1,n)} - \overline{D_s(R_s,0,n)}]$, $R_S$ refers to source encoding rate, and β refers to intra-refresh rate, n refers to frame, λ refers to the video stream based constant, $\overline{D_s(R_s,0,n)}$ and $\overline{D_s(R_s,1,n)}$ refers to the average time value of total inner & outer model selection in the T slots to all the frames;

$D_c$ refers to channel distortion, $$\overline{D_c(p, \beta)} = \left(\frac{a}{1-b+b\beta}\right)\left(\frac{p}{1-p}\right)E[F_d(n, n-1)],$$

p refers to packet loss ratio, b refers to the constant of video stream random motion, a refers to power loss ratio of encoding system, $E[F_d(n, n-1)]$ refers to the average value of different frame $F_d(n, n-1)$ in slot T, i.e. the mathematics expectation for $F_d(n, n-1)$.

In this method improving the cross-layer multimedia transmission quality in cognitive radio networks according to present invention, because that it minimize the video transmission distortion rate by selecting a suitable intra-refresh rate, the service quality is up to the best, the quality of application layer multimedia transmission is improved effectively, especially the multimedia service quality in time of the secondary users using the primary spectrum bands, and the system resource consume is cut down to minimum, the property features a simple process with stationary operation, suitable range is widened and it promotes the development of the radio communications technology.

PREFERRED EMBODIMENTS OF THE INVENTION

Figure 1:
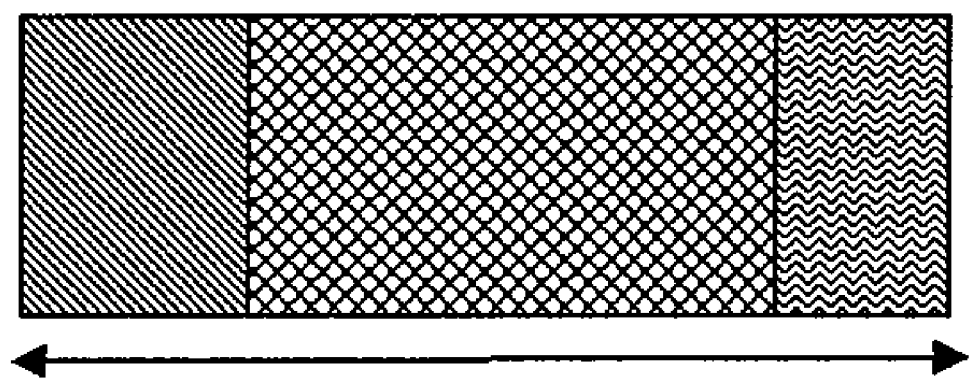
FIG. 1 is a composition diagram showing the multimedia transmission slot in cognitive radio networks system according to present invention.

To explain the present invention in greater detail, the embodiments will be described below with reference to the accompanying examples.

The system model of cognitive radio networks system:

Consider a spectrum that consists of N channels, each with bandwidth W(n), 1≦n≦N. These N channels are licensed to a network. Time is divided into slots of equal length, slot k refers to the discrete time period $[kT_s, (k+1)T_s]$. When the slot is not in use by the primary user, it will be comprised of AWGN noise and fading. The fading process and primary usage for a particular channel can be represented by a stationary and ergodics S-state Markov chain. Let s and Γ denote the instantaneous channel state and fading gain respectively. When the system state s=i, and 1≦i≦S−1, the fading gain Γ=$\gamma_i$. When the system is in state s=S, then the channel is in use by the primary user and the channel gain is irrelevant. We assume that the phase of the channel attenuation can be perfectly estimated and removed at the receiver. The S-state Markov channel model is completely described by its stationary distribution of each channel state s, denoted by ps(s), and the probability of transitioning from state i into State j after each time slot is denoted by $\{P_{i,j}\}$, 1≦I,j≦S.

In general, a finite state Markov channel (FSMC) model is constructed for a particular fading distribution by first partitioning the range of the fading gain into a finite number of sections. Then each section of the gain value corresponds to a state in the Markov chain. Given knowledge of the fading process and primary network usage, the stationary distribution ps(s) as well as channel state transition $\{P_{i,j}\}$ can be derived.

Once a channel gain has been determined for states 1, 2 . . ., S−1, the packet loss ratio is determined for each state based on the modulation and channel coding scheme. The intra-refresh rate that minimizes the total distortion for each state is then calculated using the Rate-Distortion model.

In the Protocol, the transmission time is divided into slots and the structure of each slot is shown in FIG. 1. meanwhile, "" indicates the spectrum sensing part, "" indicates the data transmission part and "" indicates the decision part.

At the beginning of a slot, the transmitter of secondary users will select a set of channels to sense. Based on the sensing outcome, the transmitter will decide whether or not to access a channel. If the transmitter decides to access a channel, some application layer parameters will be selected and the video content will be transmitted. At the end of the slot, the receiver will acknowledge the transfer by sending the actual perceived channel gain back to the transmitter. We will assume a packet for real-time multimedia applications will be discarded if a primary user is using the slot or if the channel is not accessed.

The R-D Model in Multimedia Application:

The wireless channels have limited bandwidth and are error-prone. Highly efficient coding algorithm such as H.264 and MPEG4 can compress video to reduce the required bandwidth for the video stream. Rate control is used in video coding to control the video encoder output bit rate based on various conditions to improve video quality. For example, the main tasks of MPEG4 object-based video coding are to determine how many bits are assigned to each video object in the scene and to adjust the quantization parameter to accurately achieve the target coding bit rate. In previous work, encoding rate and distortion are treated as two separate parameters based on the quantization parameter, percentage of zeros among DCT (discrete cosine transform) coefficients, or intra-refresh rate.

Highly compressed video data is vulnerable; a single bit error may cause severe distortion. This vulnerability makes error resilience at the video encoder essential. Intra update, also called intra-refreshing, of macro blocks (MB) is one approach for video error resilience and protection. An intra coded MB does not need information from previous frames which may have already been corrupted by channel errors. This makes intra coding an effective way to mitigate error propagation. On the other hand, with inter-coded MBs, channel errors from previous frames may still propagate to the current frame along the motion compensation path.

Given a source-coding bit rate $R_s$ and intra-refresh rate, we need a model to estimate the corresponding source distortion $D_s$. Refer to document: "Z. He, J. Cai, and C. Chen, "Joint source channel rate-distortion analysis for adaptive mode selection and rate control in wireless video coding", *IEEE Trans. Circ. and Syst. Video Tech.*, vol. 12, no. 6, pp. 511~523, June 2002" (hereinafter referred to as "document 1"), in which the author use simulation results to provide a closed form distortion model taking into account varying characteristics of the input video, the sophisticated data representation scheme of the coding algorithm, and the intra-refresh rate. Based on the statistical analysis of the error propagation, error concealment, and channel decoding, an advanced theoretical framework is developed in the document 1 to estimate the channel distortion Dc. Coupled with the R-D model for source coding and time varying wireless channels, an adaptive mode selection is proposed for wireless video coding and transmission.

We will use the rate-distortion model described in document 1 in our study. In which, $R_s$ indicates source encoding rate, $D_s$ indicates source distortion, $D_c$ indicates channel distortion. The source distortion $D_s$ is the quantization distortion introduced by the lossy video compression to meet a target bit rate, the channel distortion $D_c$ is resulting from channel errors. For DCT-based video coding, intra coding of a Macro Block or a frame usually requires more bits than inter coding since inter coding removes the temporal redundancy between two neighboring frames. Let β be the intra-refreshing rate, the percentage of MBs coded with intra mode. Inter coding of MBs has much better R-D performance than intra mode. However inter coding relies on information in previous frames. Packet loss due to channel errors result in error propagation along the motion-compensation path until the next intra coded MB is received. Under a certain bit rate, decreasing the intra-refresh rate decreases Ds, and increasing the intra-refresh rate decreases Dc. Thus we have a tradeoff between source and channel distortion when selecting the intra-refresh rate. We aim to find the optimal β to minimize the total end-to-end distortion given the channel bandwidth and packet loss ratio.

We will assume large slot duration to formulate a POMDP for channel selection and use the time average of all other parameters. This scheme will adapt to time varying wireless channels between 1, 2, . . . , T slots and adapt to changes in the video sequence every k of T slots, where k=1, 2, . . . .

The source distortion is given by:

$$\overline{D_s(R_s,\beta)} = \overline{D_s(R_s,0,n)} + \beta(1-\lambda+\lambda\beta)[\overline{D_s(R_s,1,n)} - \overline{D_s(R_s,0,n)}];$$

Where, $R_S$ denotes the source coding rate, β is the intra-refresh rate, n is the frame, and λ is a constant based on the video sequence, $\overline{D_s(R_s,0,n)}$ and $\overline{D_s(R_s,1,n)}$ denotes the time average all inter-mode and intra-mode selection for all frames over T time slots.

$$\overline{D_c(p,\beta)} = \left(\frac{a}{1-b+b\beta}\right)\left(\frac{p}{1-p}\right)E[F_d(n,n-1)];$$

Where, p refers to packet loss rate, b is a constant describing motion randomness of the video scene, a is the energy loss ratio of the encoder filter, and $E[F_d(n,n-1)]$ is the average value of the frame difference $F_d(n,n-1)$ over T slot, i.e. the mathematics expectation for $F_d(n,n-1)$. We will use the same error concealment strategy and packet loss ratio derivation as described in document 1.

The optimum β* is then selected by calculating the minimum total distortion:

$$\beta^* = \arg\min_{\beta}\{\overline{D_s(R_s,\beta)} + \overline{D_c(p,\beta)}\};$$

where, arg refers to the calculation symbol of β that minimums the value in the { } expression.

Refer to FIG. 1, a method improving the cross-layer multimedia transmission quality in cognitive radio networks, characterized in that: said method comprises the following steps:

(1) Determining the state space of cognitive radio networks system and the observation probability of spectrum observing sensor; determining the state space of the cognitive radio networks system; concretely as follows:

Set up the disperse & even Markov process model for the cognitive radio networks system based on the following formula:

$$V_k=[X_k(1),\ldots,X_k(N)], V_k \in \mathbb{S}=\{e_1,e_2,\ldots,e_{S-1},e_S\}^N$$

Where, $\{X_k(n)\}$ refers to the Markov chain of a channel n in S state, wherein the $X_k \in \{e_1, e_2, \ldots, e_{S-1}, e_S\}$, k refers to the slot in the cognitive radio networks, N refers to the channel amount in the radio network system.

Determining the observation probability of spectrum observing sensor in cognitive radio networks system, concretely as follows:

Determining the observation probability Pr of the channel acknowledge information observed by the spectrum observing sensor based on the following formula:

$$Pr\{Y_k|V_k,\Psi_k\}=B_k(Y_k,V_k,\Psi_k);$$

Where, $V_k$ refers to the system state in the cognitive radio networks system, $\Psi_k$ refers to the acting behavior, $Y_k$ refers to the channel acknowledge information, $Y_k \in \mathbb{A}_Y$, $\mathbb{A}_{Y,y}=\{\hat{\gamma}_1,\ldots,\hat{\gamma}_{S-1},\hat{\gamma}_S\}$, for any i<j, $\hat{\gamma}_i<\hat{\gamma}_j$ to be satisfied;

(2) Determining the behavior space and information space of the cognitive radio networks system; determining the action space of the cognitive radio networks system, concretely as follows:

Determining the complex behavior $\Psi_k$ of the cognitive radio networks system based on the following formula:

$$\Psi_k=\{a_k,(\epsilon_k,\delta_k),\Phi_k,\hat{\beta}_k\} \in (\mathbb{A}_Y, \mathbb{A}_Y, \{0,1\}, \mathbb{A}_Y, \rho);$$

Where, $a_k$ refers to the channel selection, $a_k \in \mathbb{A}_{\gamma,\delta}$; wherein the $(\epsilon_k(\alpha_k), \delta_k(\alpha_k)) \in \mathbb{A}_{\gamma,\delta}$ refers to the decision of the spectrum observing sensor, $\mathbb{A}_{\gamma,\delta}$ refers to the effective point on the receiver operation curve ROC, $\epsilon$ refers to the error alarm probability, whereas the $\Phi_k(a_k)$ refers to the access decision and the $\Phi_k(a_k) \in (0, 1)$, where the 0 indicates no access, 1 indicates access, $\beta_k(a_k)$ refers to the intra-refresh rate and $\beta_k(a_k) \in \mathbb{A}_{\gamma,\beta}$, $\hat{\beta}_k$ refers to the estimate value of $\beta_k$.

Determining the information state of the cognitive radio networks system, concretely as follows:

Determining the information state $\pi_k$ of the cognitive radio networks system based on the following formula:

$$\pi_k = \{\lambda_s(k)\}_{s \in \mathbb{S}} \in \Pi(\mathbb{S});$$

Where, the $\lambda_S(k) \in [0,1]$ refers to the probability prior to the state changeover when the system is under the state of $s \in \mathbb{S}$ starting from slot k, $\Pi(\mathbb{S}) = \{\lambda_S(k) \in [0,1], \Sigma_{s \in \mathbb{S}} \lambda_S = 1\}$ refers to the information space containing the most function conditions probability in the state space $\mathbb{S}$, the information state $\pi_k$ is refreshed as the following before the state transition according to the Bayes theorem:

$$\pi_{k+1} = \frac{\sum_{s' \in \mathbb{S}} \lambda_{s'}(k) A_{s',s} B(Y_k, s, \Psi_k)}{\sum_{s \in \mathbb{S}} \sum_{s' \in \mathbb{S}} \lambda_{s'}(k) A_{s',s} B(Y_k, s, \Psi_k)};$$

Where, $Y_k$ refers to the channel confirming information received by the transmitter in the end of slot k;

(3) Determining the transmission immediate cost of the cognitive radio networks system, concretely as follows:

Determining the total distortion mathematics expectation of the multimedia data information in the radio network system based on the following formula:

$$J_\mu = \mathbb{E}_{\{\mu_\delta, \mu_S, \mu_\Phi, \mu_\beta\}} \left[ \sum_{k=1}^{T} D(V_k, R_n, \Phi_k(n), \hat{\beta}_k(n)) \right];$$

Where, $C = D(V_k, R_n, \Phi_k(n), \hat{\beta}_k(n))$ refers to the multimedia data information distortion in the cognitive radio networks system, whereas $\mathbb{E}_{\{\mu_\delta, \mu_S, \mu_\Phi, \mu_\beta\}}$ refers to the mathematics expectation under the condition of $\mu_\delta, \mu_S, \mu_\Phi, \mu_\beta$, $\mu_\delta$ refers to the constraint condition in case of setting up the loss sensing probability $\delta$ in the spectrum observing sensor operation point, $\mu_S$ refers to the constraint condition of state S, $\mu_\Phi$ refers to the constraint condition of access discrimination, $\mu_\beta$ refers to the constraint condition of intra-refresh rate, T refers to the slot and $R_n$ refers to the target bit rate of channel n.

(4) Calculating and obtaining the sensing policy of spectrum observing sensor in the cognitive radio networks system based on said immediate cost, concretely as follows:

The sensing policy of spectrum observing sensor in the cognitive radio networks system is then given by the following formula:

$$J_k(\pi) = \min_{a \in \mathbb{A}_s} \sum_{s \in \mathbb{S}} \sum_{s' \in \mathbb{S}} \lambda_{s'}(t) A_{s',s} \times$$

-continued $$\sum_{j=1}^{S} B(y_k, j, \Psi_k) [D(V_k, R_n, \Phi_k(n), \hat{\beta}_k(n)) + J_{k+1}(t(\pi_k | \Psi_k, y_k))],$$

$$1 \le k \le T - 1;$$

$$J_T(\pi) = \min_{a \in \mathbb{A}_s} \sum_{s \in \mathbb{S}} \sum_{s' \in \mathbb{S}} \lambda_{s'}(t) A_{s',s} \times \left[ \sum_{j=1}^{S} B(y_k, j, \Psi_k) D(V_k, R_n, \Phi_k(n), \hat{\beta}_k(n)) \right];$$

Where, $B(y, s, \Psi)$ is then given by:

$$B(y < \hat{\gamma}_s, s < S, \Psi) = P_{ce}(s, v(y)) \epsilon^*;$$

$$B(y = \hat{\gamma}_s, s < S, \Psi) = 1 - \epsilon^*;$$

$$B(y < \hat{\gamma}_s, s = S, \Psi) = \frac{1 - \epsilon^*}{S - 1};$$

$$B(y = \hat{\gamma}_s, s = S, \Psi) = \epsilon^*;$$

$v(y) = i$, $1 \le i \le S$, $y = \hat{\gamma}_i$, $\epsilon^*$ is the value of error alarm probability $\epsilon$ when $\delta = \zeta$ on the receiver operating curve ROC, $$P_{ce}(i, j) = \frac{1}{2} \text{erf}\left(\frac{\gamma_j + \gamma_{j+1} - 2\gamma_i}{2\sqrt{2}\sigma}\right) - \frac{1}{2} \text{erf}\left(\frac{\gamma_j + \gamma_{j-1} - 2\gamma_i}{2\sqrt{2}\sigma}\right);$$

$$P_{ce}(i, 1) = \frac{1}{2}\left[1 + \text{erf}\left(\frac{\gamma_1 + \gamma_2 - 2\gamma_i}{2\sqrt{2}\sigma}\right)\right];$$

$$P_{ce}(i, S-1) = \frac{1}{2}\left[1 - \text{erf}\left(\frac{\gamma_{S-2} + \gamma_{S-1} - 2\gamma_i}{2\sqrt{2}\sigma}\right)\right];$$

$$P_{ce}(i, s) = 0;$$

$\sigma$ refers to the standard deviation of error estimated by channel receiver, and the erf refers to error function.

(5) Obtaining the optimal intra-refresh rate under the minimum distortion rate condition in cognitive radio networks system based on said sensing policy, consisting of following steps;

(a) Obtaining the minimum total distortion mathematics expectation $J_\mu$ of the multimedia data information in the radio network system based on said sensing policy;

(b) Obtaining a group of intra-refresh rate $\hat{\beta}_k$ based on the following formula:

$$J_\mu = \mathbb{E}_{\{\mu_\delta, \mu_S, \mu_\Phi, \mu_\beta\}} \left[ \sum_{k=1}^{T} D(V_k, R_n, \Phi_k(n), \hat{\beta}_k(n)) \right];$$

(c) Obtaining the optimal intra-refresh rate $\beta^*$ under the minimum distortion rate condition based on following formula:

$$\beta^* = \arg\min_{\beta} \{\overline{D_s(R_s, \beta)} + \overline{D_c(p, \beta)}\};$$

Where, arg refers to the calculation symbol of $\beta$ that minimums the value in the { } expression, $D_s$ refers to the source distortion, $\overline{D_s(R_s,\beta)} = \overline{D_s(R_s,0,n)} + \beta(1-\lambda+\lambda\beta)[\overline{D_s(R_s,1,n)} - \overline{D_s(R_s,0,n)}]$, $R_S$ refers to source encoding rate, and β refers to intra-refresh rate, n refers to frame, λ refers to the video stream based constant, $\overline{D_s(R_s,0,n)}$ and $\overline{D_s(R_s,1,n)}$ refers to the average time value of total inner & outer model selection in the T slot to all the frames;

$D_c$ refers to channel distortion, $$\overline{D_c(p,\beta)} = \left(\frac{a}{1-b+b\beta}\right)\left(\frac{p}{1-p}\right)E[F_d(n,n-1)],$$

p refers to packet loss ratio, b refers to the constant of video stream random motion, a refers to power loss ratio of encoding system, $E[F_d(n, n-1)]$ refers to the average value of different frame $F_d(n, n-1)$ in slot T, i.e. the mathematics expectation for $F_d(n, n-1)$.

(6) Operating the following-up encoding for the multimedia data information to be transmitted in the cognitive radio networks system based on the optimal intra-refresh rate.

In practice, we wish to determine optimum channel sensing selection, sensor operating point, access decision, and intra-refresh policies to minimize distortion conditional to the system probability of collision. With sensor and CSI (channel state information) error we will derive optimum policies using a POMDP framework. The spectrum sensor operating point is set such that δ=ζ, where δ is the probability of miss detection and ζ is the probability of collision. The optimum access strategy is to trust the sensor outcome. That is, Φ=Θ, where Φ∈{0 (no access), 1 (access)} is the access decision and Φ∈{0 (busy), 1 (idle)} is the sensor observation.

(1) State Space, Transition Probabilities and Observation Space

The system state is given by the state of system (SOS) of the primary network and channel state information (CSI). Let $\{X_k(n)\}$ denotes the S-state Martov chain for a channel n, $X_k \in \{e_1, e_2, \ldots, e_{S-1}, e_S\}$.

The system with N channels is modeled as a discrete-time homogeneous Markov process with $S^N$ states. The SOS is given by:

$$V_k = [X_k(1), \ldots, X_k(N)], V_k \in \mathbb{S} = \{e_1, e_2, \ldots, e_{S-1}, e_S\}^N.$$

The transition probabilities of the SOS are given by the $\mathbb{S} * \mathbb{S}$ matrix $\{A_{s,s'}\}$, we assume the transition probabilities are known based on network usage and channel fading characteristic.

The acknowledgment information of channel is given by: $Y_k \in \mathbb{A}_Y$, $\mathbb{A}_Y = \{\hat{\gamma}_1, \ldots, \hat{\gamma}_{S-1}, \hat{\gamma}_S \text{ (no acknowledgment)}\}$, and $\{\hat{\gamma}_i < \hat{\gamma}_j, \text{ any } i<j\}$, where, "^" indicates the estimation value of relative variable.

The spectrum sensor observation Θ, may be different at the transmitter and receiver If the transmitter and receiver use the same observations to derive the information state, then the information state can be used to maintain frequency hopping synchronization. Thus the information state will be updated with Yk and will not include the spectrum observation sensor. Let $B_k(Y_k, V_k, \Psi_k) = \Pr\{Y_k | V_k, \Psi_k\}$ denote the conditional probability of observing $Y_k$ given that the SOS is in state $V_k$ and posited action $\Psi_k$.

(2) Action Space and Information State

Due to hardware limitations, we will assume that a secondary user can only sense L=1 channel. In each slot k, the secondary user needs to decide which channel to sense, which sensor operating point on the Receiver Operating Curve (ROC) to use, whether to access the channel, and which quantized intra-refresh rate to use. Thus the action space consists of four parts:

channel selection decision $a_k \in \mathbb{A}_{Y,s}$ spectrum sensor design $(\epsilon_k(\alpha_k), \delta_k(\alpha_k)) \in \mathbb{A}_{Y,\delta}$, $\mathbb{A}_{Y,\delta}$ is the valid points on the ROC, and ϵ is the probability of false alarm access decision $\Phi_k(a_k) \in \{0 \text{ (no access)}, 1 \text{ (access)}\}$ intra-refresh rate $\beta_k(a_k) \in \mathbb{A}_{Y,\beta}$, $\hat{\beta}_k$ is the estimation value of $\beta_k$.

The composite action in slot k is denoted by $\Psi_k = \{a_k, (\epsilon_k, \delta_k), \Phi_k, \hat{\beta}_k\} \in (\mathbb{A}_{Y,s}, \mathbb{A}_{Y,\delta}, \{0, 1\}, \mathbb{A}_{Y,\beta})$.

Information State $\pi_k = \{\lambda_s(k)\}_{s \in \mathbb{S}} \in \Pi(\mathbb{S})$, wherein, $\lambda_S(k) \in [0, 1]$ denotes the conditional probability that the SOS is in s∈$\mathbb{S}$ at the beginning of slot k prior to state transition, and $\Pi(\mathbb{S}) = \{\lambda_s(k) \in [0, 1], \Sigma_{s \in \mathbb{S}} \lambda_s = 1\}$ denotes the information space which includes all possible probability mass functions on the state space $\mathbb{S}$.

At the end of the time slot, the transmitter receives acknowledgment $Y_k$, the information state is then updated using Bayes theorem before state transition.

$$\pi_{k+1} = \frac{\sum_{s' \in \mathbb{S}} \lambda_{s'}(k) A_{s',s} B(Y_k, s, \Psi_k)}{\sum_{s \in \mathbb{S}} \sum_{s' \in \mathbb{S}} \lambda_{s'}(k) A_{s',s} B(Y_k, s, \Psi_k)};$$

Given information vector $\pi_k$ indicates the distribution of the system state $V_k$ in slot k when the state transition is given by the followings:

$$P_r\{V_k = s\} = \sum_{s' \in \mathbb{S}} \lambda_{s'}(k) A_{s',s} \forall s \in \mathbb{S}.$$

(3) Cost Definition

Multimedia distortion is used as the immediate cost; the immediate cost is defined as:

$$C = D(V_k, R_n, \Phi_k(n), \hat{\beta}_k(n)).$$

Where, $R_n$ is the target bit rate for channel n.

We assume $\Phi_k(n)=0$ (no access) is equal valent to 100% packet loss. The expected total cost of the POMDP represents the overall distortion for a video sequence transmitted over T slots and can be expressed as follows:

$$J_\mu = \mathbb{E}_{\{\mu_\delta, \mu_S, \mu_\Phi, \mu_\beta\}}\left[\sum_{k=1}^{T} D(V_k, R_n, \Phi_k(n), \hat{\beta}_k(n))\right]$$

Where, $\mathbb{E}_{\{\mu_\delta, \mu_S, \mu_\Phi, \mu_\beta\}}$ indicates the expectation given under condition $\mu_\delta$, $\mu_S$, $\mu_\Phi$, $\mu_\beta$. And $\mu_\delta$ indicates to set up the constraint condition of δ in operation point, $\mu_S$ indicates to taking the state S as the constraint condition, $\mu_\Phi$ refers to taking the access discrimination as the constraint condition, $\mu_\beta$ refers to taking the intra-refresh rate as the constraint condition.

(4) Object Constraining

The aim of the invention is find out the optimal $\{\mu^*_\delta, \mu^*_S, \mu^*_\Phi, \mu^*_\beta\}$ to minimize the mathematic expectation of total distortion under the collision constraint $P_c(k)$.

$$\{\mu^*_S, \mu^*_\delta, \mu^*_\Phi, \mu^*_\beta\} =$$

-continued $$\arg\min_{\mu_s,\mu_\delta,\mu_\Phi,\mu_\beta} \mathbb{E}_{\{\mu_s,\mu_\delta,\mu_\Phi,\mu_\beta\}}\left[\sum_{k=1}^{T} D(V_k, R_n, \Phi_k(n), \hat{\beta}_k(n))\bigg|\pi_k\right]$$

$$\text{s.t. } P_c(k) = Pr\{\Phi_k(a_k) = 1 \mid X_k(a_k) = S\} < \zeta \forall k;$$

Where, s.t. means constraining condition (Subject To), $\zeta$ means the maximum tolerable probability of collision.

(5) Value Function

In the present invention, the function $J_k(\pi)$ indicates the minimum cost expectation obtained in slot k ($1 \leq k \leq T$) under information $\pi_k$ from beginning of slot k. the behavior of secondary user is indicated by $\Psi$, and confirm $Y_k = y_k$, the cost may be calculated from immediate cost $C = D(V_k, R_n, \Phi_k(n), \hat{\beta}_k(n))$ of slot k and the minimum future expectation cost $J_{k+1}(\pi)$.

$$\pi_{k+1} = \{\lambda_s(k+1)\}_{s \in \mathbb{S}} = T(\pi_k \delta \Psi_k, y_k);$$

This formula means indicate the refreshed SOS after acknowledging of behavior $\Psi_k$ and acknowledging $y_k$ in slot k.

The sensing policy is given by as follows:

$$J_k(\pi) =$$

$$\min_{a \in A_s} \sum_{s \in S} \sum_{s' \in S} \lambda_{s'}(t) A_{s',s} \times \sum_{j=1}^{S} B(y_k, j, \Psi_k)\big[D(V_k, R_n, \Phi_k(n), \hat{\beta}_k(n)) +$$

$$J_{k+1}(T(\pi_k \mid \Psi_k, y_k))\big], 1 \leq k \leq T-1;$$

$$J_T(\pi) = \min_{a \in A_s} \sum_{s \in S} \sum_{s' \in S} \lambda_{s'}(t) A_{s',s} \times$$

$$\left[\sum_{j=1}^{S} B(y_k, j, \Psi_k) D(V_k, R_n, \Phi_k(n), \hat{\beta}_k(n))\right];$$

Where, B (y, s, $\Psi$) is then given by:

$$B(y < \hat{\gamma}_S, s < S, \Psi) = P_{ce}(s, v(y))\varepsilon^*;$$

$$B(y = \hat{\gamma}_S, s < S, \Psi) = 1 - \varepsilon^*;$$

$$B(y < \hat{\gamma}_S, s = S, \Psi) = \frac{1 - \varepsilon^*}{S - 1};$$

$$B(y = \hat{\gamma}_S, s = S, \Psi) = \varepsilon^*;$$

Where, $v(y) = i$, $1 < i < S$, $y = \hat{\gamma}_i$, $\varepsilon^*$ is the value of $\varepsilon$ when $\delta = \zeta$ on the ROC and is calculated by the following formula:

$$P_{ce}(i, j) = \frac{1}{2}\text{erf}\left(\frac{\gamma_j + \gamma_{j+1} - 2\gamma_i}{2\sqrt{2}\,\sigma}\right) - \frac{1}{2}\text{erf}\left(\frac{\gamma_j + \gamma_{j-1} - 2\gamma_i}{2\sqrt{2}\,\sigma}\right);$$

$$P_{ce}(i, 1) = \frac{1}{2}\left[1 + \text{erf}\left(\frac{\gamma_1 + \gamma_2 - 2\gamma_i}{2\sqrt{2}\,\sigma}\right)\right];$$

$$P_{ce}(i, S-1) = \frac{1}{2}\left[1 - \text{erf}\left(\frac{\gamma_{S-2} + \gamma_{S-1} - 2\gamma_i}{2\sqrt{2}\,\sigma}\right)\right];$$

$$P_{ce}(i, s) = 0;$$

$\sigma$ refers to the standard deviation of error estimated by channel receiver, and the erf refers to error function.

For the detail content of error function, refer to: "A. T. Hoang and M. Motani, "Buffer and channel adaptive transmission over fading channels with imperfect channel state information," in *IEEE Wireless Communications and Networking Conference*, vol. 3, March 2004, pp. 1891-1896".

(6) Intra-Refresh Policy

The optimal $J_\mu$, i.e. the minimum distortion is then obtained from above calculation. From the following formula:

$$J_\mu = \mathbb{E}_{\{\mu_\delta,\mu_s,\mu_\Phi,\mu_\beta\}}\left[\sum_{k=1}^{T} D(V_k, R_n, \Phi_k(n), \hat{\beta}_k(n))\right];$$

A new group of intra-refresh rate $\hat{\beta}_k$ is then obtained, and from the following formula:

$$\beta^* = \arg\min_{\beta}\{\overline{D_s(R_s, \beta)} + \overline{D_c(p, \beta)}\};$$

A minimum distortion rate is then obtained and also the optimal intra-refresh rate, in this way, the application lay service quality for secondary user is thus improved.

In this method improving the cross-layer multimedia transmission quality in cognitive radio networks according to present invention, because that it minimize the video transmission distortion rate by selecting a suitable intra-refresh rate, the service quality is up to the best, the quality of application layer multimedia transmission is improved effectively, especially the multimedia service quality in time of the secondary users using the primary spectrum bands, and the system resource consume is cut down to minimum, the property features a simple process with stationary operation, suitable range is widened and it promotes the development of the radio communications technology.

While the present invention has been particularly shown and described with references to preferred embodiments thereof, it will be understood that various changes in form and details may be made therein without departing from the spirit and scope of the invention. It is clearly understood therefore that the illustration and figures are by way of example only and not to be taken by way of limitation.

We claim:

1. A method improving the cross-layer multimedia transmission quality in cognitive radio networks, characterized in that said method comprises the following steps:
   (1) determining the state space of cognitive radio networks system and the observation probability of spectrum observing sensor;
   (2) determining the behavior space and the information state of the cognitive radio networks system;
   (3) determining the transmission immediate cost of the cognitive radio networks system;
   (4) calculating and obtaining the sensing policy of spectrum observing sensor in the cognitive radio networks system based on said immediate cost;
   (5) obtaining the optimal intra-refresh rate under the minimum distortion rate condition in said cognitive radio networks system based on said sensing policy;
   (6) operating the following-up encoding for the multimedia data information to be transmitted in the cognitive radio networks system based on the optimal intra-refresh rate.

2. The method improving the cross-layer multimedia transmission quality in cognitive radio networks according to claim 1, characterized in that said determining the state space of the cognitive radio networks system is concretely as follows:

set up the disperse & even Markov process model for the cognitive radio networks system based on the following formula:

$$V_k=[X_k(1),\ldots,X_k(N)], V_k \in \mathbb{S}=\{e_1,e_2,\ldots,e_{S-1},e_S\}^N$$

where, $\{X_k(n)\}$ refers to the Markov chain of a channel n in S state, wherein the $X_k \in \{e_1, e_2, \ldots, e_{S-1}, e_S\}$, k refers to the slot in the cognitive radio networks, N refers to the channel amount in the radio network system.

3. The method improving the cross-layer multimedia transmission quality in cognitive radio networks according to claim 2, characterized in that said determining the observation probability of spectrum observing sensor in cognitive radio networks system is concretely as follows:

determining the observation probability Pr of the channel acknowledge information observed by the spectrum observing sensor based on the following formula:

$$Pr\{Y_k | V_k, \Psi_k\} = B_k(Y_k, V_k, \Psi_k);$$

where, $V_k$ refers to the system state in the cognitive radio networks system, $\Psi_k$ refers to the acting behavior, $Y_k$ refers to the channel acknowledge information, $Y_k \in \mathbb{A}_{Y,\gamma}, \mathbb{A}_{Y,\gamma} = \{\hat{\gamma}_1, \ldots, \hat{\gamma}_{S-1}, \hat{\gamma}_S\}$, for any $i<j, \hat{\gamma}_i < \hat{\gamma}_j$, to be satisfied.

4. The method improving the cross-layer multimedia transmission quality in cognitive radio networks according to claim 3, characterized in that said determining the behavior space of the cognitive radio networks system is concretely as follows:

determining the complex behavior $\Psi_k$ of the cognitive radio networks system based on the following formula:

$$\Psi_k = \{a_k(\epsilon_k, \delta_k), \Phi_k, \hat{\beta}_k\} \in (\mathbb{A}_{Y,s}, \mathbb{A}_{Y,\delta}, \{0,1\}, \mathbb{A}_{Y,\beta});$$

where, $a_k$ refers to the channel selection, $a_k \in \mathbb{A}_{Y,\delta}$; wherein the $(\epsilon_k(\alpha_k), \delta_k(\alpha_k)) \in \mathbb{A}_{Y,\delta}$ refers to the decision of the spectrum observing sensor, $\mathbb{A}_{Y,\delta}$ refers to the effective point on the receiver operation curve ROC, $\epsilon$ refers to the error alarm probability, whereas the $\Phi_k(a_k)$ refers to the access decision and the $\Phi_k(a_k) \in (0, 1)$, where the 0 indicates no access, 1 indicates access, $\beta_k(a_k)$ refers to the intra-refresh rate and $\beta_k(a_k) \in \mathbb{A}_{Y,\beta}$, $\hat{\beta}_k$ refers to the estimate value of $\beta_k$.

5. The method improving the cross-layer multimedia transmission quality in cognitive radio networks according to claim 4, characterized in that said determining the information state of the cognitive radio networks system is concretely as follows:

determining the information state $\pi_k$ of the cognitive radio networks system based on the following formula:

$$\pi_k = \{\lambda_s(k)\}_{s \in \mathbb{S}} \in \Pi(\mathbb{S});$$

where, the $\lambda_S(k) \in [0,1]$ refers to the probability prior to the state changeover when the system is under the state of $s \in \mathbb{S}$ starting from slot k, $\Pi(\mathbb{S}) = \{\lambda_S(k) \in [0,1], \Sigma_{s \in \mathbb{S}} \lambda_S = 1\}$ refers to the information space containing the most function conditions probability in the state space $\mathbb{S}$, the information state $\pi_k$ is refreshed as the following before the state transition according to the Bayes theorem:

$$\pi_{k+1} = \frac{\sum_{s' \in S} \lambda_{s'}(k) A_{s',s} B(Y_k, s, \Psi_k)}{\sum_{s \in S} \sum_{s' \in S} \lambda_{s'}(k) A_{s',s} B(Y_k, s, \Psi_k)};$$

where, $Y_k$ refers to the channel confirming information received by the transmitter in the end of slot k.

6. The method improving the cross-layer multimedia transmission quality in cognitive radio networks according to claim 5, characterized in that said determining the transmission immediate cost of the cognitive radio networks system is concretely as follows:

determining the total distortion mathematics expectation of the multimedia data information in the radio network system based on the following formula:

$$J_\mu = \mathbb{E}_{\{\mu_\delta, \mu_S, \mu_\Phi, \mu_\beta\}} \left[ \sum_{k=1}^{T} D(V_k, R_n, \Phi_k(n), \hat{\beta}_k(n)) \right];$$

where, $C = D(V_k, R_n, \Phi_k(n), \hat{\beta}_k(n))$ refers to the multimedia data information distortion in the cognitive radio networks system, whereas $\mathbb{E}_{\{\mu_\delta, \mu_S, \mu_\Phi, \mu_\beta\}}$ refers to the mathematics expectation under the condition of $\mu_\delta, \mu_S, \mu_\Phi, \mu_\beta$, $\mu_\delta$ refers to the constraint condition in case of setting up the loss sensing probability $\delta$ in the spectrum observing sensor operation point, $\mu_S$ refers to the constraint condition of state S, $\mu_\Phi$ refers to the constraint condition of access discrimination, $\mu_\beta$ refers to the constraint condition of intra-refresh rate, T refers to the slot and $R_n$ refers to the target bit rate of channel n.

7. The method improving the cross-layer multimedia transmission quality in cognitive radio networks according to claim 6, characterized in that said Calculating and obtaining the sensing policy of spectrum observing sensor in the cognitive radio networks system based on said immediate cost is concretely as follows:

the sensing policy of spectrum observing sensor in the cognitive radio networks system is then given by the following formula:

$$J_k(\pi) = \min_{a \in A_s} \sum_{s \in S} \sum_{s' \in S} \lambda_{s'}(t) A_{s',s} \times \sum_{j=1}^{S} B(y_k, j, \Psi_k) [D(V_k, R_n, \Phi_k(n), \hat{\beta}_k(n)) + J_{k+1}(T(\pi_k | \Psi_k, y_k))], 1 \le k \le T-1;$$

$$J_T(\pi) = \min_{a \in A_s} \sum_{s \in S} \sum_{s' \in S} \lambda_{s'}(t) A_{s',s} \times \left[ \sum_{j=1}^{S} B(y_k, j, \Psi_k) D(V_k, R_n, \Phi_k(n), \hat{\beta}_k(n)) \right];$$

where, B (y, s, $\Psi$) is then given by:

$$B(y < \hat{\gamma}_S, s < S, \Psi) = P_{ce}(s, v(y))\varepsilon^*;$$

$$B(y = \hat{\gamma}_S, s < S, \Psi) = 1 - \varepsilon^*;$$

-continued $$B(y < \hat{\gamma}_S, s = S, \Psi) = \frac{1-\varepsilon^*}{S-1};$$

$$B(y = \hat{\gamma}_S, s = S, \Psi) = \varepsilon^*;$$

v(y)=i, $1<i<S$, $y=\hat{\gamma}_j$, $\epsilon^*$ is the value of error alarm probability $\epsilon$ when $\delta=\zeta$ on the receiver operating curve ROC, $$P_{ce}(i, j) = \frac{1}{2}\mathrm{erf}\left(\frac{\gamma_j + \gamma_{j+1} - 2\gamma_i}{2\sqrt{2}\,\sigma}\right) - \frac{1}{2}\mathrm{erf}\left(\frac{\gamma_j + \gamma_{j-1} - 2\gamma_i}{2\sqrt{2}\,\sigma}\right);$$

$$P_{ce}(i, 1) = \frac{1}{2}\left[1 + \mathrm{erf}\left(\frac{\gamma_1 + \gamma_2 - 2\gamma_i}{2\sqrt{2}\,\sigma}\right)\right];$$

$$P_{ce}(i, S-1) = \frac{1}{2}\left[1 - \mathrm{erf}\left(\frac{\gamma_{S-2} + \gamma_{S-1} - 2\gamma_i}{2\sqrt{2}\,\sigma}\right)\right];$$

$$P_{ce}(i, s) = 0;$$

σ refers to the standard deviation of error estimated by channel receiver, and the erf refers to error function.

8. The method improving the cross-layer multimedia transmission quality in cognitive radio networks according to claim 7, characterized in that said obtaining the optimal intra-refresh rate under the minimum distortion rate condition in cognitive radio networks system based on said sensing policy consists of following steps:

(51) obtaining the minimum total distortion mathematics expectation $J_\mu$ of the multimedia data information in the radio network system based on said sensing policy;

(52) obtaining a group of intra-refresh rate $\hat{\beta}_k$ based on the following formula:

$$J_\mu = \mathbb{E}_{\{\mu_\delta, \mu_S, \mu_\Phi, \mu_\beta\}}\left[\sum_{k=1}^{T} D(V_k, R_n, \Phi_k(n), \hat{\beta_k}(n))\right];$$

(53) obtaining the optimal intra-refresh rate β* under the minimum distortion rate condition based on following formula:

$$\beta^* = \underset{\beta}{\mathrm{argmin}}\{\overline{D_s(R_s, \beta)} + \overline{D_c(p, \beta)}\};$$

where, arg refers to the calculation symbol of β that minimums the value in the { } expression, $D_s$ refers to the source distortion, $\overline{D_s(R_s,\beta)}=\overline{D_s(R_s,0,n)}+\beta(1-\lambda+\lambda\beta)[\overline{D_s(R_s,1,n)}-\overline{D_s(R_s,0,n)}]$, $R_S$ refers to source encoding rate, and β refers to intra-refresh rate, n refers to frame, λ refers to the video stream based constant, $\overline{D_s(R_s,0,n)}$ and $\overline{D_s(R_s,1,n)}$ refers to the average time value of total inner & outer model selection in the T slot to all the frames;

$D_c$ refers to channel distortion, $$\overline{D_c(p, \beta)} = \left(\frac{a}{1-b+b\beta}\right)\left(\frac{p}{1-p}\right)E[F_d(n, n-1)],$$

p refers to packet loss ratio, b refers to the constant of video stream random motion, a refers to power loss ratio of encoding system, $E[F_d(n, n-1)]$ refers to the average value of different frame $F_d(n, n-1)$ in slot T, i.e. the mathematics expectation for $F_d(n, n-1)$.

\* \* \* \* \*